(12) United States Patent
Wu et al.

(10) Patent No.: US 7,039,909 B2
(45) Date of Patent: May 2, 2006

(54) METHOD AND APPARATUS FOR PERFORMING COMPILER TRANSFORMATION OF SOFTWARE CODE USING FASTFORWARD REGIONS AND VALUE SPECIALIZATION

(75) Inventors: Youfeng Wu, Palo Alto, CA (US); Li-Ling Chen, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 867 days.

(21) Appl. No.: 09/969,962

(22) Filed: Sep. 29, 2001

(65) Prior Publication Data

US 2003/0066061 A1 Apr. 3, 2003

(51) Int. Cl.
*G06F 9/45* (2006.01)

(52) U.S. Cl. .................. 717/156; 717/157; 717/127

(58) Field of Classification Search ......... 717/124–128, 717/156, 157–161, 151–155
See application file for complete search history.

(56) References Cited

U.S. PATENT DOCUMENTS

| | | | | |
|---|---|---|---|---|
| 5,764,885 A | * | 6/1998 | Sites et al. | 714/45 |
| 6,170,083 B1 | * | 1/2001 | Adl-Tabatabai | 717/158 |
| 6,175,948 B1 | * | 1/2001 | Miller et al. | 716/7 |
| 6,377,909 B1 | * | 4/2002 | Ikegami | 703/14 |
| 6,487,716 B1 | * | 11/2002 | Choi et al. | 717/159 |
| 6,609,248 B1 | * | 8/2003 | Srivastava et al. | 717/147 |
| 6,779,114 B1 | * | 8/2004 | Chow et al. | 713/189 |
| 2002/0170043 A1 | * | 11/2002 | Bagley et al. | 717/153 |

OTHER PUBLICATIONS

Chandra et al, "Physical type checking for C", ACM PASTE, pp 66–75, Sep. 1999.*
Zhai et al, "Compiler optimzation of memory resident value communication between speculative threads", IEEE CGO, pp 1–12, Sep. 2004.*
Xu et al, "Safety checking of machine code", ACM PLDI, pp 70–82, 2000.*
Auslander et al, "Fast effective dynamic compilation", ACM PLDI, pp 149–159, May 1996.*
Calder, B., et al., "Value Profiling and Optimization," UCSD Technical Report, CS98–592, Jul. 1998, 15 pages.*
Purser, Z, et al., "A Study of Slipstream Processors," Proceeding of the Annual International Symposium on Microarchitecture, Dec. 10, 2000, pp. 269–280.*
Gupta, R., et al., "Path Profile Guided Partial Dead Code Elimination Using Prediction," Parallel Architectures and Compilation Techniques, Proceeding of the 1997 International Conference, pp. 102–113.*
Calder, B., et al., "Value Profiling and Optimization," UCSD Technical Report, CS98–592, Jul. 1998, 15 pages.

(Continued)

*Primary Examiner*—Anil Khatri
(74) *Attorney, Agent, or Firm*—Blakely, Sokoloff, Taylor & Zafman LLP

(57) ABSTRACT

A method and apparatus for providing compiler transformation of code using regions with simplified data and control flow and value specialization are described. In one embodiment, the method includes identifying in the code a plurality of potential candidates for value specialization, selecting a group of candidates from the plurality of potential candidates based on a value profile associated with each potential candidate, and determining specialized data for each selected candidate using a corresponding value profile. The method further includes forming a plurality of optimized regions based on corresponding specialized data. Each optimized region includes one or more selected candidates.

26 Claims, 9 Drawing Sheets

OTHER PUBLICATIONS

Chen, L., "FastForward: Aggressive Compiler Optimization with Speculative Multi–Threaded Support," 6 pages.

Gupta, R., et al., "Path Profile Guided Partial Dead Code Elimination Using Prediction," Parallel Architectures and Compilation Techniques, Proceeding of the 1997 International Conference, pp. 102–113.

Hwu, W., et al., "The Superblock: An Effective Technique for VLIW and Superscalar Compilation" The Journal of Supercomputing, Kluwer Academic Publishers, 1993 pp. 1–24.

Muth, R., et al., "Code Specialization Based On Value Profiles," 20 pages.

Patel, S., "Improving Trace Cache Effectiveness With Branch Promotion And Trace Packing," Proceedings of the 25th Annual International Symposium on Computer Architecture, 1998, 10 pages.

Patel, S., "rePLay: A Hardware Framework For Dynamic Program Optimization," CRCH Technical Report Draft, Dec. 1999, 26 pages.

Sundaramoorthy, K., et al., "Slipstream Processors: Improving Both Performance and Fault Tolerance," ASPLOS 9th International Conference on Architectural Support For Programming Languages and Operating Systems, Cambridge, MA, U.S.A., Nov. 12–15, 2000, pp. 257–268.

Wu, Youfeng, et al., "Better Exploration of Region–Level Value Locality with Integrated Computation Reuse and Value Prediction," Proceedings of the 28th International Symposium on Computer Architecture, Goteborg, Sweden, Jun. 30–Jul. 4, 2001, pp. 93–103.

Wu, Youfeng, et al., "Static Branch Frequency and Program Profile Analysis," Proceedings of the 27th Annual International Symposium on Microarchitecture, San Jose, CA, U.S.A. Nov. 30–Dec. 2, 1994, pp. 1–11.

PCT Search Report PCT/US02/27985 dated Jan. 5, 2004, 7 pages.

Purser, Z, et al., "A Study of Slipstream Processors," Proceeding of the Annual International Symposium On Microarchitecture, Dec. 10, 2000, pp. 269–280.

Rotenberg, E., "Trace Processors," Proceedings of the 30th Annual International Symposium on Microarchitecture, Research Triangle Park, NC, U.S.A., Dec. 1–3, 1997, pp. 138–148.

Steffan, J., et al., "The Potential For Using Thread–Level Data Speculation to Facilitate Automatic Parallelization," Proceedings 1998 4th International Symposium on HighPerformance Computer Architecture, Las Vegas, NV, U.S.A., Feb. 1–4, 1998, pp. 2–13.

* cited by examiner

METHOD AND APPARATUS FOR PERFORMING COMPILER TRANSFORMATION OF SOFTWARE CODE USING FASTFORWARD REGIONS AND VALUE SPECIALIZATION

RELATED APPLICATIONS

This application is related to U.S. patent application Ser. No. 10/007,669 filed on Oct. 30, 2001, entitled "Method, Apparatus, and System To Optimize Frequently Executed Code And To Use Compiler Transformation And Hardware Support To Handle Infrequently Executed Codes," and U.S. patent application Ser. No. 09/965,757 filed on Sep. 28, 2001, entitled "Method, Apparatus, And System Formulate Regions Of Reusable Instructions," and assigned to the assignee of the present application and hereby incorporated by reference.

FIELD OF THE INVENTION

The present invention relates generally to compilers, and more specifically to compilers capable of optimizing software code based on value specialization.

BACKGROUND OF THE INVENTION

Generally, the result of using a one-pass compiler is object code that executes much less efficiently than it might if more effort were expended in its compilation. Therefore, it is desirable to optimize object code.

In an article entitled "rePlay: A Hardware Framework for Dynamic Program Optimization", CRHC Technical Report Draft, December 1999, by Sanjay J. Patel and Steven S. Lumetta, an optimization technique named "rePlay" is disclosed. However, rePlay relies mainly on hardware to form regions and optimize the regions at runtime. This reliance on hardware can be unrealistic since many optimizations can be complicated and require significant hardware and software compilation time.

Other optimization techniques, including partial redundancy elimination (PRE) and partial dead-code elimination (PDE), can also sometimes be ineffective and are quite complex to implement. PDE is disclosed in "Path profile guided partial dead code elimination using predication", Parallel Architectures and Compilation Techniques, 1997, by Rajiv Gupta, David E. Benson, and Jesse Z. Fang.

Further, an optimization technique called "Superblock" is disclosed in "The Superblock: An Effective Technique for VLIW and Superscalar Compilation", The Journal of Supercomputing, Kluwer Academic Publishers, 1993, pp. 229–248, by Wen-mei W. Hwu et al. Data and control flow for optimization and scheduling are generally simplified in a superblock. However, a superblock is still a multiple exit region. Thus, the optimization and scheduling need to handle issues such as side exit and speculation.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EMBODIMENTS

Figure 1:
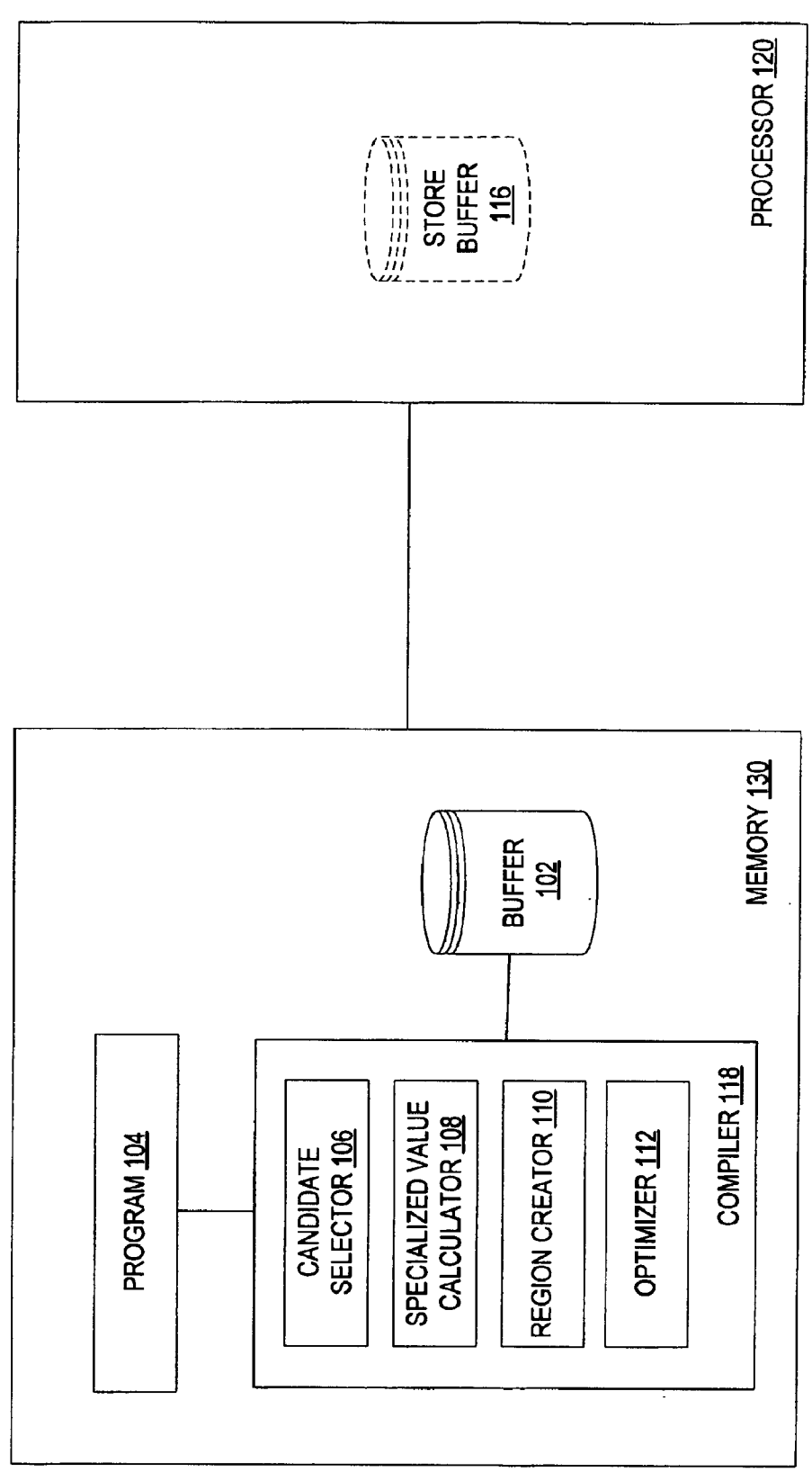
FIG. 1 is a block diagram of one embodiment of a computing system.

A method and apparatus for performing compiler transformation of software code based on value specialization are described.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. Instructions are executable using one or more processing devices (e.g., processors, central processing units, etc.).

The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

Overview

The method and apparatus of the present invention provide a mechanism for performing compiler transformation based on value specialization. A program may have expressions that most of the time take on particular values. Value specialization is directed to replacing such expressions with values that are likely to be the result of these expressions, thereby simplifying the program's control and data flow.

In one embodiment, a program is examined to identify potential candidates for value specialization within the code. The potential candidates may be sub-regions of code or specific instructions (e.g., a load instruction that reads a value from memory to a register). Various factors may be considered when identifying potential candidates for value specialization. For example, a potential candidate may need to have a predictable control and data flow and/or be on the critical path (i.e., frequently used).

Next, for each potential candidate a value profile is defined using a corresponding historical data. In one embodiment, in which a potential candidate is a sub-region, historical data includes sets of live-in values and sets of live-out values that resulted from prior executions of this sub-region. In another embodiment, in which a potential candidate is a load instruction, historical data includes values that were loaded during prior executions of the load instruction from the specified memory address.

Based on their value profiles, potential candidates are evaluated and those that have high-probability values satisfying a predefined threshold are added to a group of selected candidates. For each of the selected candidates, its high-probability values are designated as specialized values. For example, each candidate sub-region is associated with its most frequent live-in and most frequent live-out values. Each candidate load instruction is associated with its most frequent loaded value.

Further, specialized values are used to form optimized regions that include corresponding selected candidates. In one embodiment, the formation of optimized regions begins with modifying the original code to create, for each selected candidate, the branches that are strongly biased in one direction using the specialized values associated with this candidate. Next, regions with simplified control and data flow are defined. In one embodiment, these regions are fastforward regions (FFRs) that are specialized using the biased branches. In one embodiment, FFRs are specialized by incorporating the biased branches and replacing the high-probability branches with corresponding specialized values and ignoring the low-probability branches. Alternatively, FFRs are specialized by using assert instructions to promote the low-probability branches and using specialized data to replace the high-probability branches. Next, the resulting regions are optimized.

Afterwards, for each optimized region, original code is prepared for execution on a separate thread to guarantee correctness if a low-probability value occurs during the execution.

Accordingly, value specialization allows the compiler to create regions with simplified control and data flow, thereby enabling more aggressive optimization of the code by the compiler. For example, the use of value specialization may result in the elimination of additional dead code (e.g., when the low-probability branch is removed, the code that depends on the branch condition may also become dead). In addition, simplified control flow may remove the need for speculation and compensation code in many cases and may reduce the number of live variables and thus register pressure. Furthermore, large regions are opted to scheduling and thus yield a better instruction-per-cycle (IPC) parameter. All these and other advantages result in significant improvement of the program performance.

FIG. 1 is a block diagram of one embodiment of a computing system 100. Processing system 100 includes processor 120 and memory 130. Processor 120 is a processor capable of compiling software and executing the resulting object code. Processor 120 can also be a processor capable of simultaneous speculative execution of code on two threads. Processor 120 can be any type of processor capable of executing software, such as a microprocessor, digital signal processor, microcontroller, or the like. Processing system 100 can be a personal computer (PC), mainframe, handheld device, portable computer, set-top box, or any other system that includes software.

Memory 130 can be a hard disk, a floppy disk, random access memory (RAM), read only memory (ROM), flash memory, or any other type of machine medium readable by processor 120. Memory 130 can store instructions for performing the execution of the various method embodiments of the present invention.

Memory 130 stores a program 104, a compiler 118 to compile program 104 and create object code, and a buffer 102 to store historical data pertaining to prior executions of the object code. In one embodiment, compiler 118 includes a candidate selector 106, a specialized value calculator 108, a region creator 110, and an optimizer 118.

Candidate selector 106 is responsible for analyzing program 104 to identify potential candidates for value specialization. Various factors are considered in this analysis. In one embodiment, in which a potential candidate is a load instruction, the major factors are whether the load instruction is on the critical path of the program's data flow. In another embodiment, in which a potential candidate is a sub-region, a qualified sub-region needs to include at least one instruction, be on the critical path and have live-in and live-out registers. In addition, a candidate sub-region should not contain memory update instructions (e.g., store instructions) and function call instruction, and its load instructions should be limited to read-only load instructions etc.

Specialized value calculator 108 is responsible for defining a value profile for each of the potential candidates based on corresponding historical data stored in buffer 102. The corresponding historical data includes sets of values pertaining to prior executions of the potential candidate. For example, if the potential candidate is a sub-region, the corresponding historical data includes multiple sets of values of its live-in registers and live-out registers that were recorded during prior executions of the sub-region within program 104. If the potential candidate is a load instruction, the corresponding historical data includes multiple loaded values recorded during prior executions of the load instruction within program 104.

Next, specialized value calculator 108 uses the value profiles to determine which of the potential candidates should be selected for further processing. In one embodiment, the potential candidate is selected for further processing if its most frequent historical data has a frequency ratio higher than a predefined threshold as will be described in greater detail below. For each selected candidate, its most-frequent data is then designated as specialized data.

Region creator 110 uses the specialized data of each candidate to form a region with simplified control and data flow graphs. Each region may include a single candidate or multiple candidates. In one embodiment, a FastForward technique is used to form the regions, as will be described in more detail below. Alternatively, any other compiler technique known in the art can be used if such compiler technique is capable of forming regions with simplified control and data flow during the time of the program's compilation based on corresponding specialization values.

Once the regions are formed, they are optimized by optimizer 112 to create more efficient code. Further, in one embodiment, region creator 110 evaluates each optimized region to determine whether the benefit of using the optimized region outweighs the overhead associated with the use of the optimized region. If the overhead is higher than the benefit, the optimized region is discarded. In one embodiment, after the optimized regions are finalized, original code is prepared for each optimized region for subsequent execution on a separate thread to guarantee correctness if a low-probability value occurs during the execution of the program. In one embodiment, the original code and a corresponding optimized region are executed simultaneously on two speculative threads.

In one embodiment, processor 120 includes store buffer 116. Store buffer 116 temporarily stores the results produced during the execution of each optimized region. When the execution of the original code confirms that the results of the optimized region are correct, the results in store buffer 116 can be committed (after the results are produced). If a low-probability value occurs during the execution of the original code, the execution of the optimized region is interrupted and the results in store buffer 116 are discarded.

Figure 2:
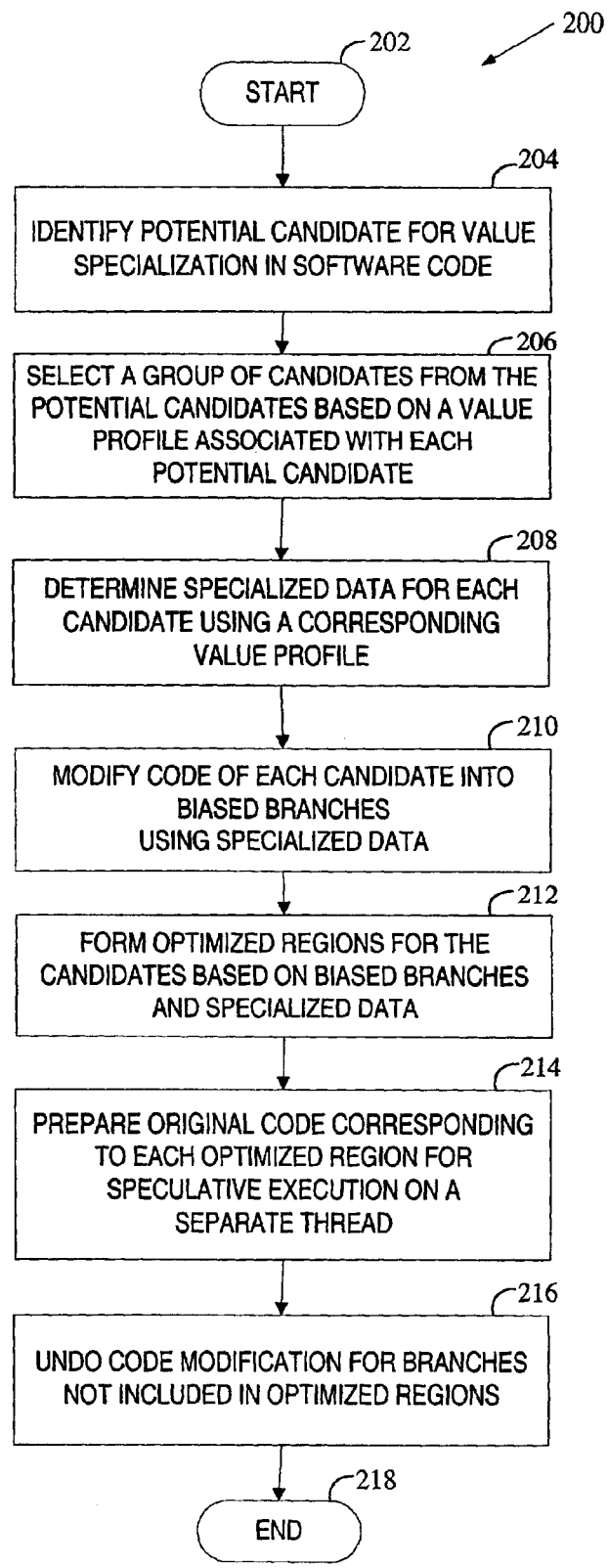
FIG. 2 is a flow diagram of one embodiment of a process for performing compiler transformation of program code based on value specialization.

FIG. 2 is a flow diagram of one embodiment of a process 200 for performing compiler transformation of program code based on value specialization. The process may be performed by processing logic that may comprise hardware (e.g., circuitry, dedicated logic, etc.), software (such as run on a general purpose computer system or a dedicated machine), or a combination of both.

Referring to FIG. 2, process 200 begins with processing logic examining the program to identify potential candidates for value specialization (processing block 204). The potential candidates may be sub-regions of code or specific instructions (e.g., a load instruction that moves a value from memory to a register). As described in more detail above, various factors are considered when identifying potential candidates for value specialization (e.g., whether a potential candidate has a predictable data flow, whether it is on a critical path, etc.).

At processing block 206, processing logic selects a group of specialization candidates from the potential candidates using value profiles associated with potential candidates. A value profile is defined using a corresponding set of historical data. In one embodiment, in which a potential candidate is a sub-region, historical data includes sets of live-in values and sets of live-out values that resulted from prior executions of this sub-region. In another embodiment, in which a potential candidate is a load instruction, historical data includes values that were loaded from the memory address specified in the load instruction during prior executions of the load instruction.

In one embodiment, each potential candidate is evaluated based on its value profile, and a determination is made as to whether its most frequent historical data satisfies a predefined threshold (i.e., whether its set of historical data includes high-probability values). If this determination is positive, the potential candidate is added to a group of selected candidates. Alternatively, the potential candidate is discarded.

At processing block 208, processing logic identifies specialized values for each selected candidate. The specialized values include one or more high-probability values selected from the historical data. For example, the specialized data for each candidate sub-region includes its most frequent live-in and corresponding most frequent live-out values. The specialized data for each candidate load instruction includes its most frequent loaded values.

In one embodiment, at processing block 210, processing logic modifies the original code of each candidate into branches (e.g., by performing a check on the validation of assumed values) that are strongly biased in one direction using the specialized values of this candidate, as will be described in more detail below.

At processing block 212, processing logic forms regions that include corresponding selected candidates. These regions have simplified control and data flow. In one embodiment, these regions are fastforward regions (FFRs) that are specialized using the biased branches. In one embodiment, FFRs are specialized by incorporating the biased branches and replacing the high-probability branches with corresponding specialized values and ignoring the low-probability branches, as will be described in more detail below in conjunction with FIG. 3. Alternatively, FFRs are specialized by using assert instructions to promote the low-probability branches and by using specialized data to replace the high-probability branches, as will be described in more detail below in conjunction with FIG. 4. Next, the resulting regions are optimized.

At processing block 214, the original code corresponding to each optimized region is prepared for execution on a separate thread to guarantee correctness if a low-probability value occurs during the execution.

Afterwards, at processing block 216, the created branches that are not included in any of the optimized regions are removed to reinstate the corresponding original code.

FastForward Technique

The FastForward technique is a compiler technique used to form specialized regions (referred to as FastForward regions or FFRs) of frequently executed code by ignoring infrequently executed conditions. The correctness is guaranteed by employing speculative multi-threaded hardware and compiler transformation to handle infrequent code. One example of specialization is to remove low-probability branches. That is, the compiler forms an FFR by making a copy of a sub-control flow graph and removing low-probability branches from the FFR. For each of the branches eliminated in the FFR, the compiler either inserts an assert instruction inside the FFR or places an abort instruction in the original code. The compiler selects the appropriate instruction by comparing benefits associated with the use of each instruction. The benefits largely depend on the scheduled cycles associated with each instruction. For example, it is more beneficial to have an abort instruction if its cycle occurs in the beginning of the execution. When the execution of the instruction is scheduled at a later time, the use of an assert instruction would be more beneficial.

The original code (and abort instructions when appropriate) constitutes the Checker code. The Checker code is executed on a separate thread called Checker.

Figure 3:
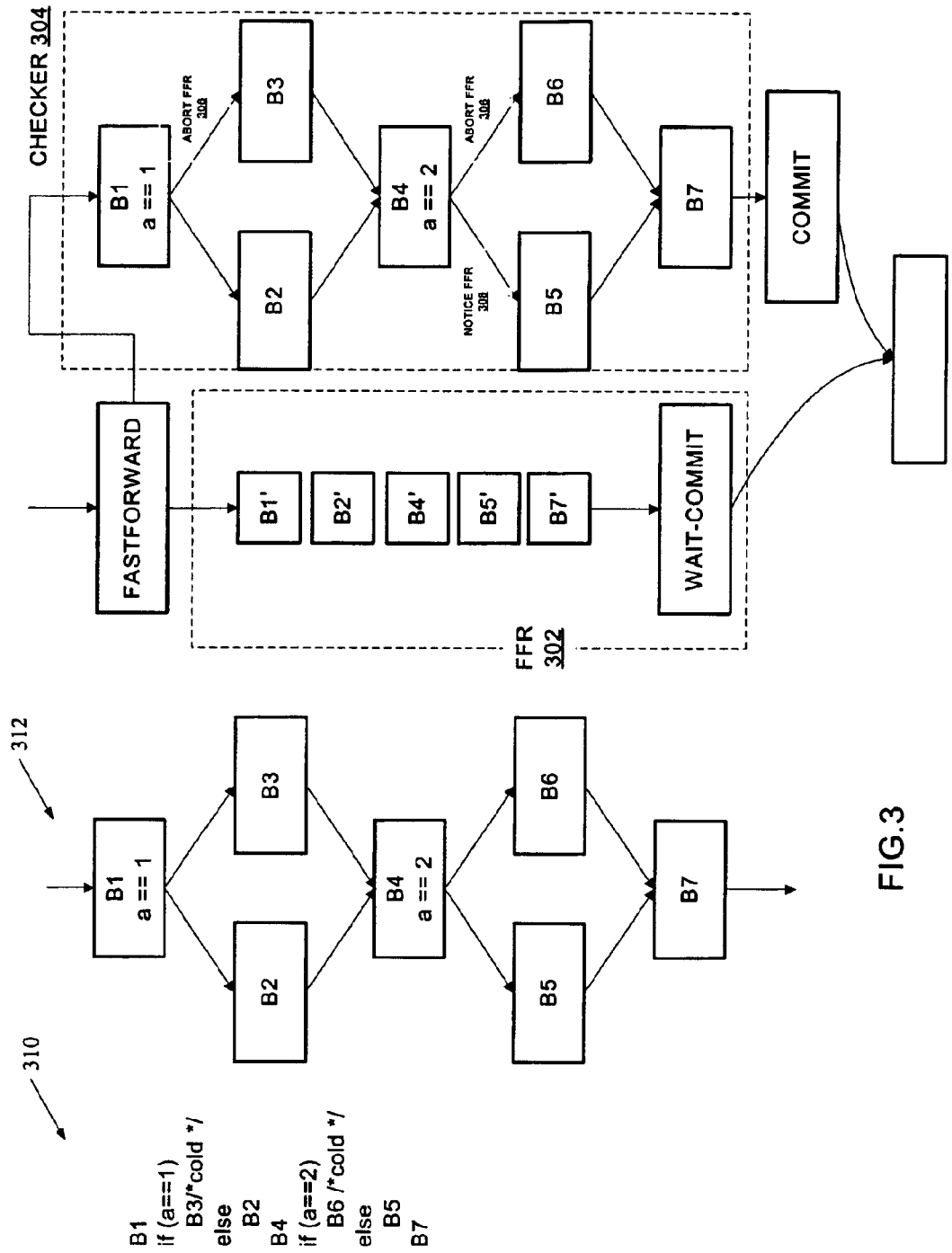
FIG. 3 illustrates the formation of an FFR and the use of abort instructions in a checker code.

FIG. 3 illustrates the formation of an FFR and the use of abort instructions in a checker code. Referring to FIG. 3, code 310 represents a portion of a source program. Graph 312 is the original control flow graph corresponding to code 310. FFR 302 is formed by removing two infrequent branches to B3 and B6. As shown in FIG. 3, FFR 302 has a simplified control and data flow, thereby allowing the compiler to perform more efficient and aggressive optimization.

Checker code 304 is based on original graph 312 with two abort instructions 306. Each abort instruction 306 can stop the execution of FFR 302 ("kill FFR 302") when the infrequent code is encountered during the speculative execution of checker code 304. A "notice FFR" instruction 308 stops the execution of checker code 304. Notice FFR instruction 308 is placed at this location of checker code 304 because the subsequent execution of checker code 304 does not include any infrequent branches. Notice FFR instruction 308 allows the results produced by FFR 402 to be committed when they are finished.

Figure 4:
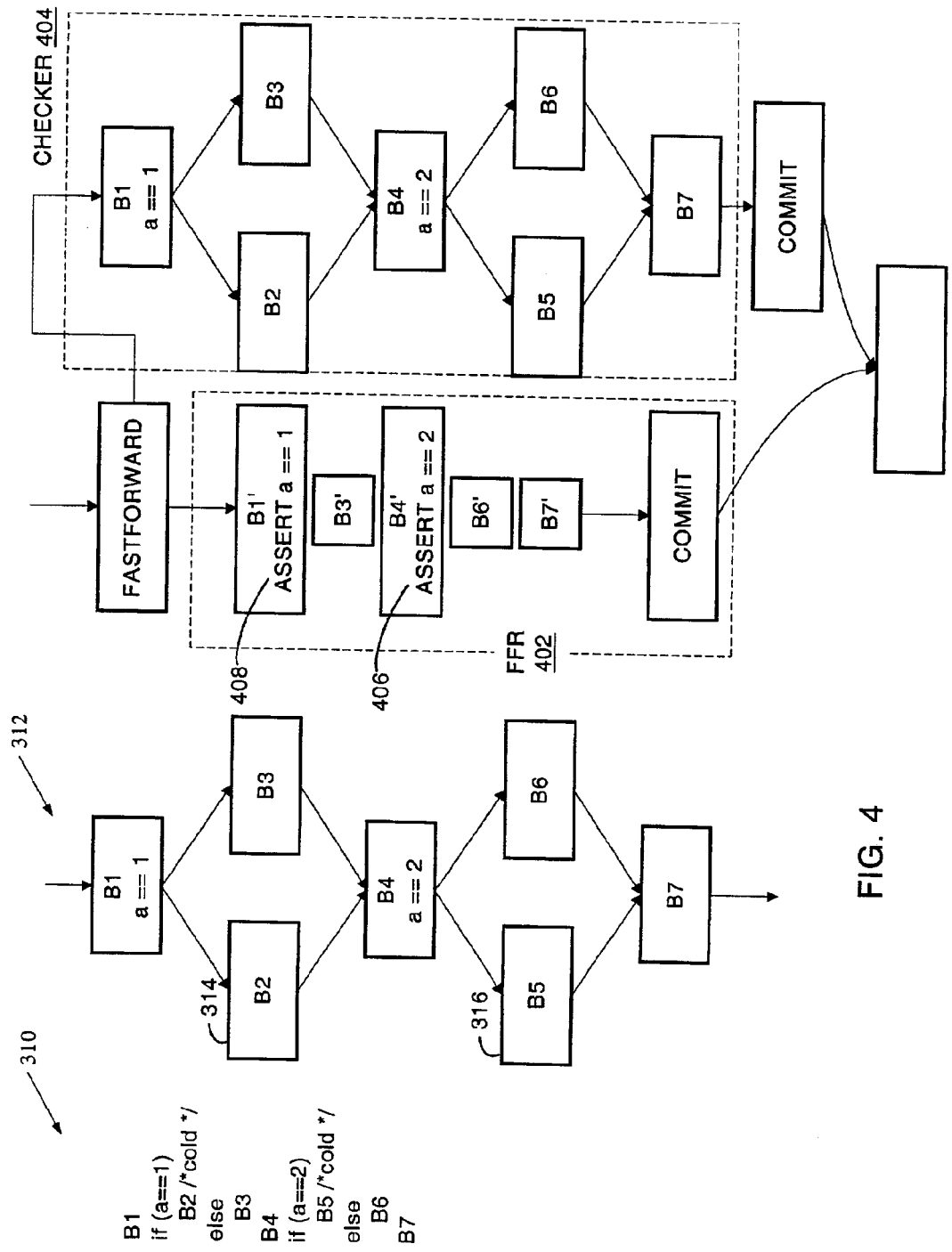
FIG. 4 illustrates the formation of an FFR and the use of assert instructions in a checker code.

FIG. 4 illustrates the formation of an FFR with the use of assert instructions. Referring to FIG. 4, FFR 402 includes assert instructions 408 and 406 that result from infrequent branches 314 and 316 in original graph 312. An assert instruction can either take a predicate of the removed branch as the sole operand or take the source register of the removed check as the operand. The assert instruction fires when the predicate becomes true or the source register has a NAT (Not a Thing) value. A fired assert instruction kills the execution of FFR 402.

It should be noted that although FIGS. 3 and 4 illustrate examples of branch specialization, the description of FFR formation provided herein applies to value specialization as well.

Each candidate FFR is generally a single entry, single exit region after all the cold edges are removed. A candidate FFR can include internal branches (including loop back branches), or a group of blocks that do not include any function calls and that are connected by unconditional branches, internal branches (including loop back branches). It should be noted that there are many types of code optimizations that are more effective when being applied to single entry, single exit regions than to regions with more complex structures.

Accordingly, a candidate FFR should have a high completion probability (i.e., a low probability of a side exit occurring) and good opportunities for optimizations.

Figure 5:
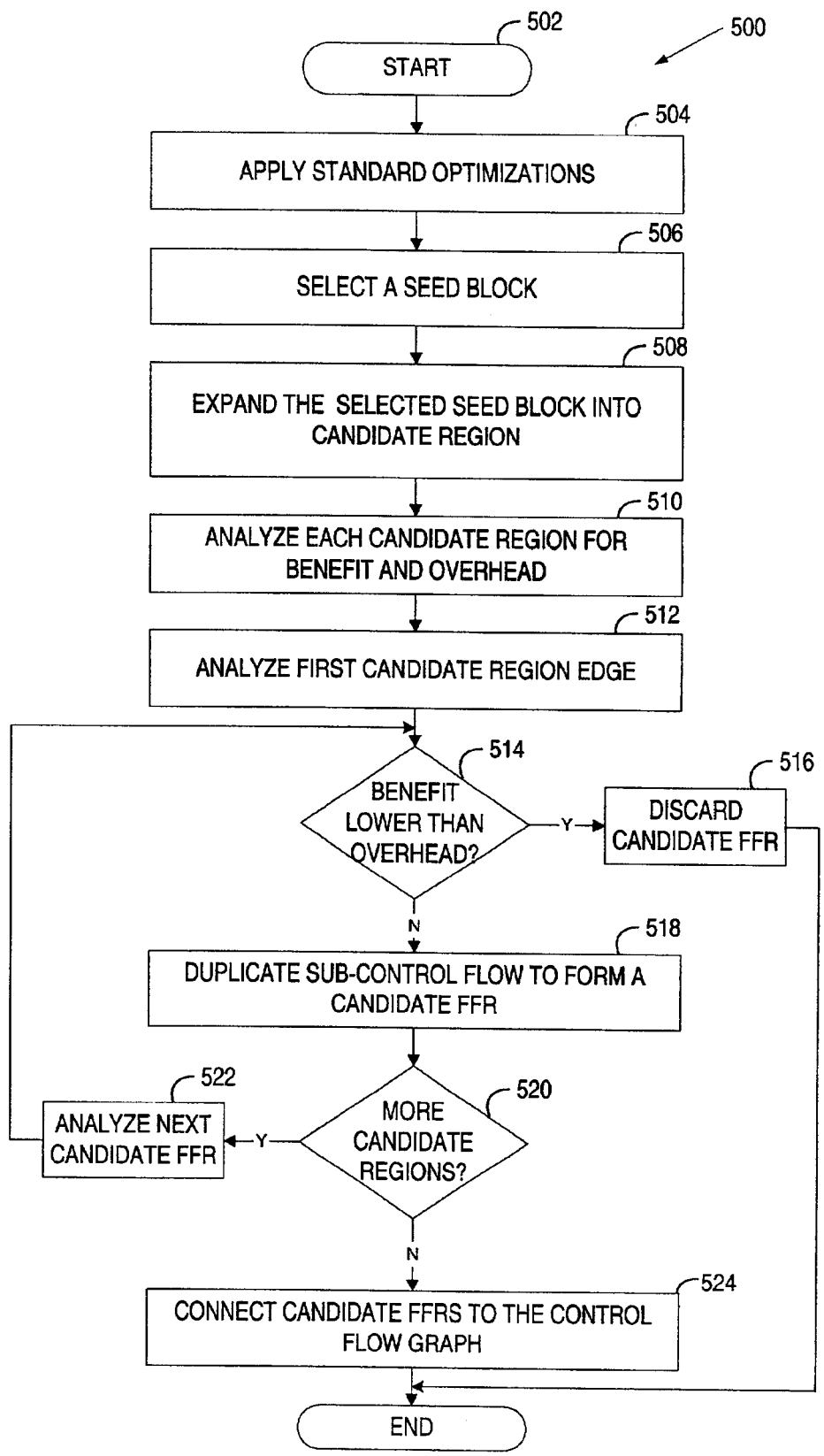
FIG. 5 is a flow diagram of one embodiment of a process for forming FFRs.

FIG. 5 is a flow diagram of one embodiment of a process for forming FFRs. The process may be performed by processing logic that may comprise hardware (e.g., circuitry, dedicated logic, etc.), software (such as run on a general purpose computer system or a dedicated machine), or a combination of both.

Referring to FIG. 5, process 500 begins at processing block 504 with processing logic applying standard available optimizations (including edge profiling feedback and scheduling) to the program to provide the best baseline code possible, prior to selecting and forming candidate FFRs for the program. Baseline code is the original code that does not include any FFRs. Furthermore, it should be noted that an FFR is selected and formed only if the region can provide an improvement over the baseline code from which the region is derived.

Next, processing logic continues with defining candidate regions and forming FFRs from the candidate regions. In defining a candidate region, a seed block for a candidate region is first selected (processing block 506). A typical seed block should be frequently executed, should include a highly biased branch instruction, should not be already included in another candidate regions, and should not have any predecessor blocks that can be selected as a seed block. Once it is selected, the seed block is duplicated and expanded into a candidate region (processing block 508). The candidate region should satisfy a number of requirements. For example, the candidate region should have a main entry and a main exit, its control flow should reach from the main entry to the main exit with a very high probability (i.e., high completion probability), etc. In addition, the candidate region may have a number of side exits, but each of its side exits should have a very low exit probability (e.g., <0.5%).

At processing block 510, each candidate region is analyzed for the benefit and overhead (e.g., using information such as exit probability and critical path cycles). In one embodiment, during the analysis, a region may be trimmed to reduce the overhead. When the analysis is completed, a determination is made at decision box 514 as to whether the benefit of using the candidate region is still lower than the overhead that may result from the use of the candidate region. If the determination is positive, the candidate region is discarded (processing block 516). Alternatively, the sub-control flow graph of the candidate region is duplicated to form a candidate FFR (processing block 518).

Further, a determination is made as to whether more candidate regions remain to be analyzed (decision box 520). If the determination is positive, a next candidate region is analyzed (processing block 522), and blocks 514–518 are performed for the next candidate region. The above mentioned process repeats for each remaining candidate region.

Once all FFRs are formed (i.e., the determination made at decision box 520 is positive), they are connected to the control flow graph with the FastForward and wait-commit instructions, as shown in FIG. 3. Subsequently, region-based optimizations are applied to each of the candidate FFRs. Further, global optimizations are applied to the whole program by treating each FFR as an atomic operation. After optimizations, the actual benefit of each candidate FFR over the original code is compared. A candidate FFR will be discarded if its benefit does not outweigh the overhead.

Sub-Region Based Value Specialization

Figure 6:
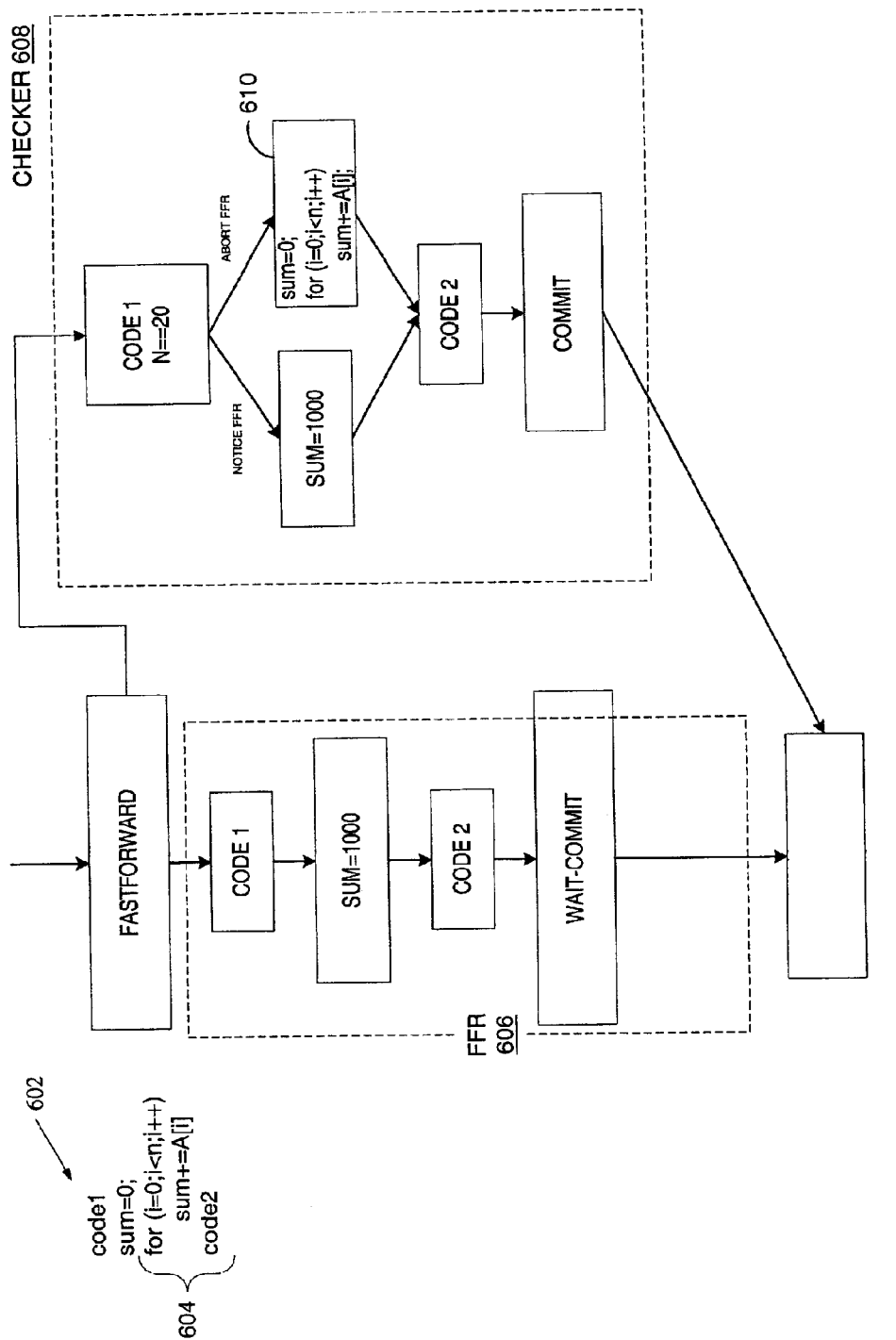
FIG. 6 illustrates the transformation of program code based on sub-region value specialization.

As described above, the compiler may transform the program code based on sub-region value specialization. FIG. 6 illustrates the transformation of program code based on sub-region value specialization.

Referring to FIG. 6, assume the array A in a region of code 602 is read-only and a loop 604 often iterates twenty times and produces the same output value (e.g., sum=1000). If the frequency ratio associated with this output value exceeds a predefined threshold, loop 604 can be specialized to this high-probability value for the sum (e.g., to one thousand). The sub-region value specialization can be used to create an FFR 606. FFR 606 is a specialized region because it uses a special value for the sub-region 604 and skips its entire computation for other values. The computation for other values is handled in a checker code 608 in block 610. Checker code 608 executes on a separate thread. If the execution of loop 604 iterates twenty times, a notice FFR instruction is executed which stops further execution of checker code 608. If loop 604 iterates less or more than twenty times, then an abort instruction is executed to kill FFR 606, and checker code 608 proceeds with execution of the code shown in block 610.

Figure 7:
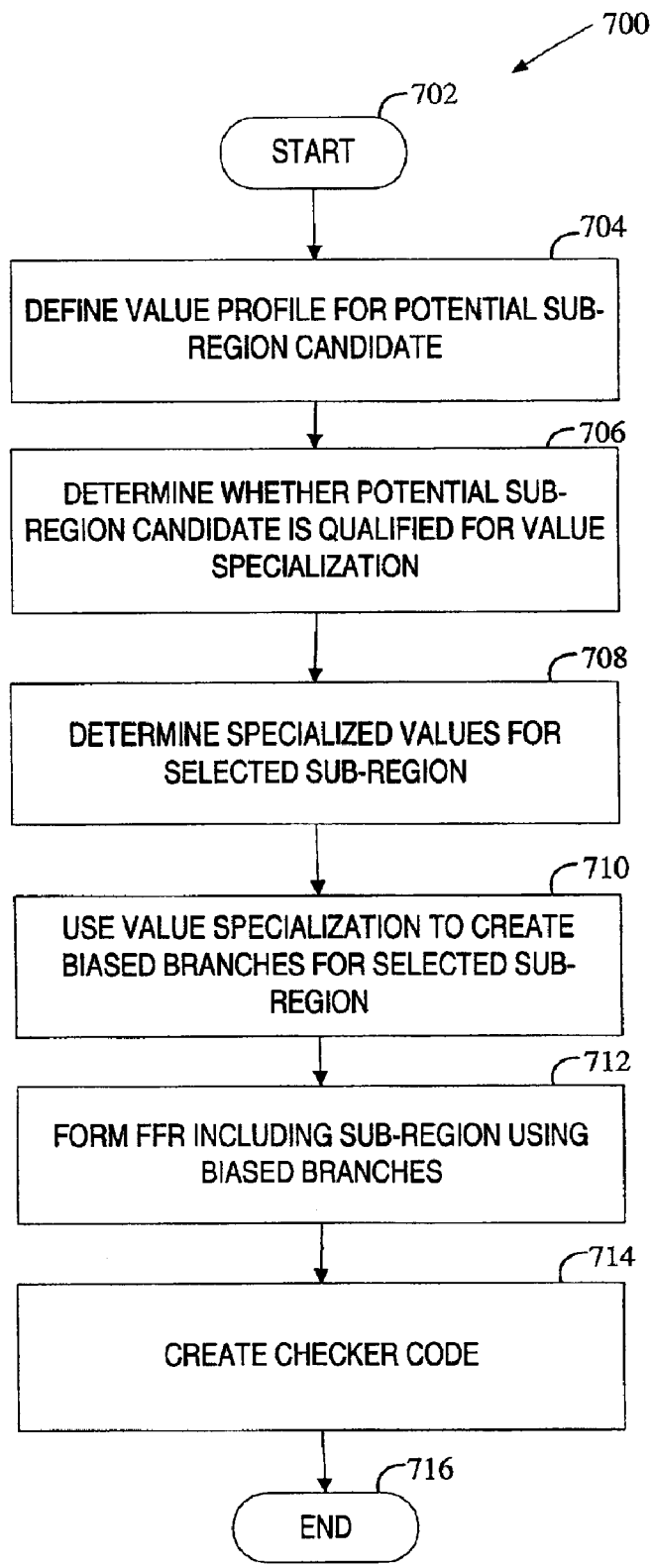
FIG. 7 is a block diagram of a process for providing compiler transformation of program code based on value specialization of a sub-region.

FIG. 7 is a block diagram of a process 700 for providing compiler transformation of program code based on value specialization of a sub-region. The process may be performed by processing logic that may comprise hardware (e.g., circuitry, dedicated logic, etc.), software (such as run on a general purpose computer system or a dedicated machine), or a combination of both.

Referring to FIG. 7, process 700 begins with processing logic defining a value profile for a potential sub-region candidate (processing block 704) and determining whether the potential sub-region candidate is qualified for value specialization (processing block 706). The following example illustrates how the qualification of a sub-region R is performed.

For a candidate sub-region R, assume its live-in registers are LVI(R) and live-out registers are LVO(R). The set of values in LVI(R) at the entry of sub-region R is the live-in set values. The set of values in the LVO(R) at the exit of sub-region R is the live-out set-values. The value profile consists of the following information:

F1(I): The frequency of the set of live-in and live-out values that have the highest likelihood of occurring during the execution of sub-region R;

F(R): The total number of historical sets of live-in and live-out values for sub-region R;

VI(R): The high-probability live-in set-values;

VO(R): The high-probability live-out set-values.

Sub-region R is selected for specialization if the frequency ratio exceeds a predefined threshold. That is, sub-region R is selected if F1(R)/F(R)>threshold (e.g., 99%).

Next, at processing block 708, the specialized values for the selected sub-region are determined. In the example described above, the specialized values are VI(R) and VO(R). At processing block 710, the value specialization is used to create biased branches for the selected sub-region. For example, for sub-region R from the example described above, the following biased branches can be created (using an aggregated comparison LVI(R)==VI(R) as a short hand for a series of simple comparisons $r1==c1\&\& r2==c2\&\& \ldots rk==ck$ for LVI(R)={r1, r2, ..., rk} and VI(R)={c1, c2, ..., ck}):

IF (LVI(R)==VI(R))
LVO(R)=VO(R)/*specialized code*/
ELSE
R

Frequency ratio of F1(R)/F(R) is assigned to the branch from the IF statement to the specialized code. Since F1(R)/F(R)>threshold (e.g., 99%), this branch is highly biased.

The biased branches are then used in forming an FFR that includes sub-region R (processing block 712). At processing block 714, a checker code is also created that includes both high-probability and low-probability branches as illustrated in FIG. 6.

Load-Based Value Specialization

Figure 8:
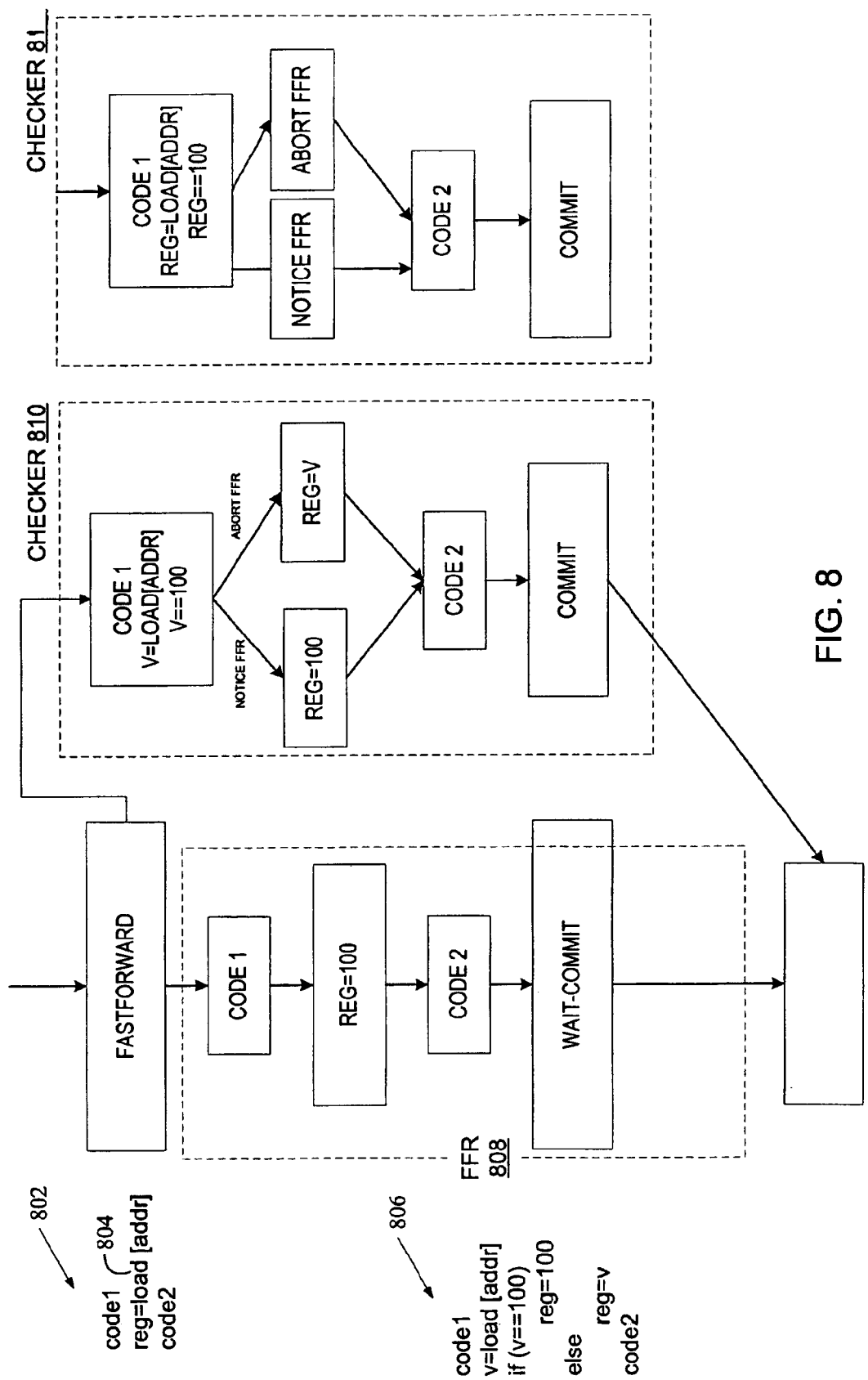
FIG. 8 illustrates the transformation of program code based on load value specialization.

FIG. 8 illustrates the transformation of program code based on load value specialization. Referring to FIG. 8, region of code 802 includes a load instruction 804. Assume the loaded value of load instruction 804 is often equal to one hundred. If the frequency ratio of load instruction 804 exceeds a predefined threshold, the loaded value of one hundred can be selected as a specialized value for load instruction 804. Using this specialized value, load instruction 804 can be converted to biased branches shown in region 806. Based on the biased branches, a FFR 808 is created. Inside FFR 808, the load instruction is eliminated and the code depending on the load can be moved early to improve performance. A checker code 810 includes both the high-probability and low-probability branches from code 806. Checker code 810 can be optimized by a traditional value forwarding, resulting into a new checker code 812.

Note that even though the specialized code 806 contains a load instruction before the work branch "IF(v==1000)", FFR region 808 contains only the specialized code. During the FFR formation, the work branch was removed (by inserting an abort instruction in checker code 810), and as a result, the load instruction preceding this branch was also eliminated because this branch was the only use of the loaded value. If an assert instruction is used (instead of the abort instruction), the load instruction remains inside FFR 808. However, the FFR makes the specialized code and the load instruction independent from each other. That is, the specialized code can be executed in parallel with the load instruction. Because the load operation takes several cycles, the code following the specialized code can also be executed before the execution of the load instruction completes, thereby reducing the number of cycles.

Figure 9:
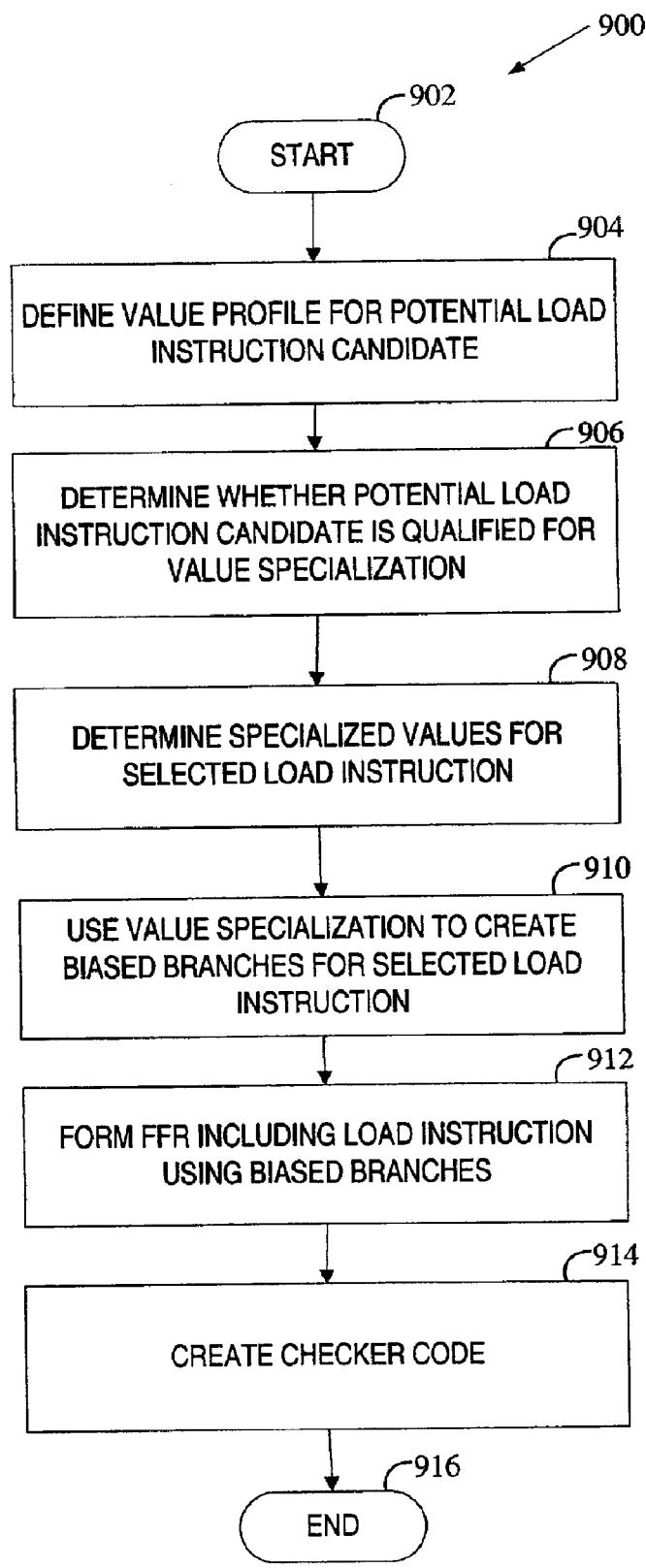
FIG. 9 is a block diagram of a process for providing compiler transformation of program code based on value specialization of a load instruction.

FIG. 9 is a block diagram of a process 900 for providing compiler transformation of program code based on value specialization of a load instruction. The process may be performed by processing logic that may comprise hardware (e.g., circuitry, dedicated logic, etc.), software (such as run on a general purpose computer system or a dedicated machine), or a combination of both.

Referring to FIG. 9, process 900 begins with processing logic defining a value profile for a potential load instruction candidate (processing block 904) and determining whether the potential load instruction candidate is qualified for value specialization (processing block 906). The following example illustrates how the qualification of load instruction I is performed.

For a candidate load instruction I, assume the register defined by the load is LO(I). The value profile consists of the following information:

F1(I): The frequency of a loaded value that has the highest likelihood of occurring during the execution of load instruction I;

F(I): The total number of historical loaded values for load instruction I;

V(I): The high-probability loaded value.

Load instruction I is selected for specialization if the frequency ratio exceeds a predefined threshold. That is, load instruction I is selected if F1(I)/F(I)>threshold (e.g., 99%).

Next, at processing block 908, the specialized value for the selected load instruction is determined. In the example described above, the specialized value is V(I). At processing block 910, the value specialization is used to create biased branches for the selected load instruction. For example, assume the memory address in the load instruction is ADDR (I). Based on the specialized value, the following biased branches can be created:

v=load[ADDR(I)}
IF (v==LV(I))
LO(I)=V(I)/*specialized code*/
ELSE
LO(I)=v

Frequency ratio of F1(R)/F(R) is assigned to the branch from the IF statement to the specialized code. Since F1(R)/F(R)>threshold (e.g., 99%), this branch is highly biased.

The high-probability branch is then used in forming an FFR that includes sub-region R (processing block 910). At processing block 912, a checker code is also created that includes both the high-probability and low-probability branches as illustrated in FIG. 8.

In one embodiment, if the FFR is discarded (e.g., due to its insufficient benefit), the modified code is reinstated to remove biased branches.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   identifying a plurality of potential candidates for value specialization in software code;
   selecting a group of candidates from the plurality of potential candidates based on a value profile associated with each of the plurality of potential candidates;
   determining specialized data for each candidate in the group of candidates using a corresponding value profile; and
   forming a plurality of fast forward regions (FFRs) based on corresponding specialized data, each of the plurality of FFRs including one or more candidates from the group of candidates.

2. The method of claim 1 further comprising:
   creating a checker code associated with each of the plurality of FFRs for speculative execution on a separate thread, the checker code including original code corresponding to said each of the plurality of FFRs.

3. The method of claim 2 wherein the said each of the plurality of FFRs includes one or more assert instructions to kill the execution of said each of the plurality of FFRs when data other than the specialized data occurs during the execution of said each of the plurality of FFRs.

4. The method of claim 2 wherein the checker code includes one or more abort instructions to stop the execution of said each of the plurality of FFRs when data other than the specialized data occurs during the execution of the checker code.

5. The method of claim 1 wherein selecting the group of candidates further comprises: defining a value profile for each of the plurality of potential candidates based on historical data associated with each of the plurality of potential candidates;
   analyzing each value profile to find a set of historical data occurring with the highest frequency within the value profile;
   determining whether the highest frequency ratio is greater than a predefined frequency ratio threshold;
   if the frequency ratio is greater than the threshold, adding a corresponding potential candidate to the group of selected candidates; and
   if the frequency ratio is not greater than the threshold, discarding the corresponding potential candidate.

6. The method of claim 1 wherein the specialized data of each candidate is a set of historical data occurring with the highest frequency within a value profile of a corresponding potential candidate of the plurality of potential candidates.

7. The method of claim 1 wherein forming the plurality of FFRs comprises:
   modifying original code to create a biased branch for each candidate in the group of candidates using the specialized data;
   defining the plurality of FFRs using corresponding biased branches;
   comparing a benefit associated with use of each of the plurality of FFRs with an overhead associated with use of said each of the plurality of FFRs; and
   discarding said each of the plurality of FFRs if the overhead outweighs the benefit.

8. The method of claim 1 wherein the group of candidates includes one or more load instructions.

9. The method of claim 8 wherein specialized data pertaining to each of the load instructions is a loaded value occurred with the most frequency within a value profile associated with said each of the load instructions.

10. The method of claim 1 wherein the group of candidates includes one or more sub-regions of code.

11. The method of claim 10 wherein specialized data pertaining to each of the sub-regions includes the most frequent set of live-in values and the most frequent set of live-out values within a value profile associated with said each of the sub-regions.

12. An apparatus comprising:
   a candidate selector to identify a plurality of potential candidates for value specialization in software code;
   a specialized value calculator to select a group of candidates from the plurality of potential candidates based on a value profile associated with each of the plurality of potential candidates, and to determine specialized data for each candidate in the group of candidates using a corresponding value profile; and
   a region creator to form a plurality of fast forward regions (FFRs) based on corresponding specialized data, each of the plurality of FFRs including one or more candidates from the group of candidates.

13. The apparatus of claim 12 wherein the specialized value calculator is to select the group of candidates by defining a value profile for each of the plurality of potential candidates based on historical data associated with said each of the plurality of potential candidates, analyzing each value profile to find one or more historical values occurring with the highest frequency within the value profile, determining whether the highest frequency ratio is greater than a predefined frequency ratio threshold, adding a corresponding potential candidate to the group of selected candidates if the frequency ratio is greater than the threshold, and discarding the corresponding potential candidate if the frequency ratio is not greater than the threshold.

14. The apparatus of claim 12 wherein the specialized data of each candidate is one or more historical values occurring with the highest frequency within the value profile of a corresponding potential candidate of the plurality of potential candidates.

15. The apparatus of claim 12 wherein the region creator is to form a plurality of FFRs by modifying original code to create biased branches for each candidate in the group of candidates using the specialized data;

defining the plurality of FFRs using corresponding biased branches;

comparing a benefit associated with use of each of the plurality of FFRs with an overhead associated with use of said each of the plurality of FFRs; and discarding said each of the plurality of FFRs if the overhead outweighs the benefit.

16. The apparatus of claim 12 wherein the group of candidates includes one or more load instructions.

17. The apparatus of claim 16 wherein specialized data pertaining to each of the load instructions is a loaded value occurred with the most frequency within a value profile associated with said each of the load instructions.

18. The apparatus of claim 12 wherein the group of candidates includes one or more sub-regions of code.

19. The apparatus of claim 18 wherein specialized data pertaining to each of the sub-regions includes the most frequent set of live-in values and the most frequent set of live-out values within a value profile associated with said each of the sub-regions.

20. A system comprising:

a compiler to select a plurality of candidates for value specialization from software code based on a value profile associated with each of the plurality of candidates, to determine specialized data for each selected candidate using a corresponding value profile, and to form a plurality of fast forward regions (FFRs) covering one or more of the selected candidates based on corresponding specialized data;

a memory to store the software code and the compiler; and a processor, coupled to the memory, to execute the compiler.

21. The system of claim 20 wherein the specialized data of each candidate is one or more historical values occurring with the highest frequency within historical data of a corresponding potential candidate of the plurality of potential candidates.

22. The system of claim 20 wherein the group of candidates includes one or more load instructions.

23. The system of claim 20 wherein the group of candidates includes one or more sub-regions of code.

24. A computer readable medium that provides instructions, which when executed on a processor, cause said processor to perform operations comprising:

identifying a plurality of potential candidates for value specialization in software code;

selecting a group of candidates from the plurality of potential candidates based on a value profile associated with each of the plurality of potential candidates;

determining specialized data for each candidate in the group of candidates using a corresponding value profile; and forming a plurality of fast forward regions (FFRs) based on corresponding specialized data, each of the plurality of FFRs including one or more candidates from the group of candidates.

25. The computer readable medium of claim 24 wherein the group of candidates includes one or more load instructions.

26. The computer readable medium of claim 24 wherein the group of candidates includes one or more sub-regions of code.

* * * * *